April 3, 1928.

S. C. CARNEY 1,664,850

PROCESS FOR MAKING ICE CRYSTALS

Filed Feb. 4, 1926

Inventor:
Samuel C. Carney,
Rippey & Kingsland
His Attorneys.

Patented Apr. 3, 1928.

1,664,850

UNITED STATES PATENT OFFICE.

SAMUEL C. CARNEY, OF TULSA, OKLAHOMA, ASSIGNOR TO ROXANA PETROLEUM CORPORATION, A CORPORATION OF VIRGINIA.

PROCESS FOR MAKING ICE CRYSTALS.

Application filed February 4, 1926. Serial No. 86,104.

This invention relates to a new ice crystal and a process for making the same.

An object of the invention is to provide as a new article of manufacture an ice crystal impregnated with a gas and optionally including a flavoring extract.

Another object of the invention is to provide a process for shaping individual ice crystals for use in icing beverages.

Another object of the invention is to provide a process for making ice crystals impregnated with a gas and formed with included flavoring extracts, syrups and the like.

Figure 1:
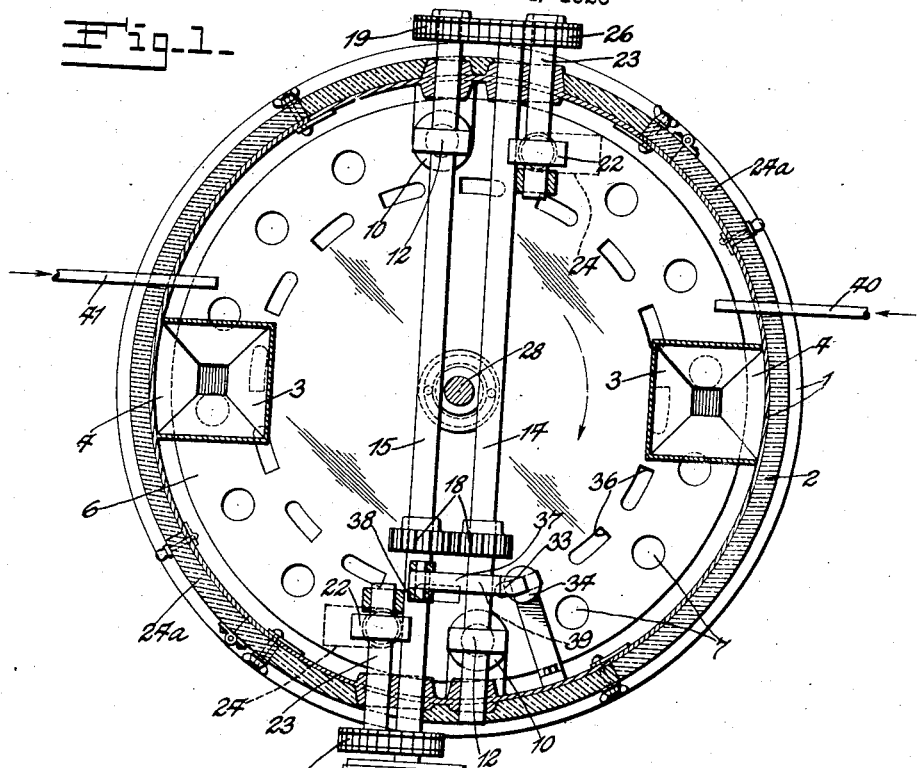
Figure 2:
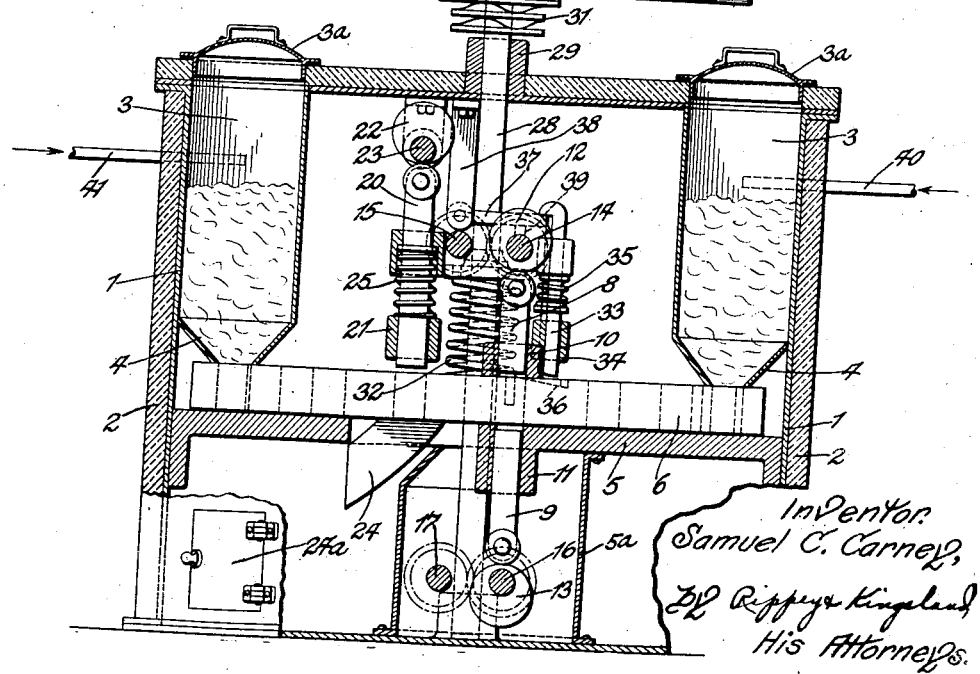

Additional advantages of the invention will be apparent from the following disclosure thereof, taken in connection with the accompanying drawing in which a preferred form of apparatus for practicing the invention is illustrated, and in which Fig. 1 is a cross section through the apparatus; and Fig. 2 is a vertical section through the apparatus.

The apparatus as disclosed in the drawing, comprises a cylindrical housing 1, the exterior walls of which are insulated by insulating material 2. Containers 3 provided with hopper bottoms 4 are oppositely arranged within the housing, said containers having openings through the top wall of the housing. The openings are closed by gas tight covers 3ᵃ. A plate 5 is supported in a horizontal position within the housing 1, dividing the housing into an upper and lower chamber.

A cylindrical plate 6 is mounted on the top face of the partition plate 5, the plate 6 being provided with a series of openings 7 arranged in equally spaced relationship adjacent to the margin of the plate, said openings extending entirely through the plate. These openings form mold cavities that are arranged to register successively with the openings in the hopper bottoms 4, the bottom wall of the cavities being closed by the surface of the plate 5. After the cavities have been filled from the hoppers with finely divided ice particles, a supply of which is maintained in the hoppers, the cavities are brought successively into registration with pairs of forming dies, each pair being arranged equidistant from the respective hoppers.

The forming dies include an upper plunger 8 and a lower plunger 9. Each of the upper plungers 8 is arranged to operate in a guideway comprising a hollow boss 10 formed at the end of a bracket rigidly supported from the interior wall of the housing. The plunger 9 operates in a guideway comprising a hollow boss 11 formed in the underface of the plate 5 and in axial alinement with the member 10.

The plungers are arranged to reciprocate in the guideways so that they move towards each other when the respective openings are brought into registration therewith. The heads of the plungers are formed with complementary dies to press the retained material in the cavities into any desired geometric shape.

The mechanism for reciprocating the dies may be of any suitable form and as the construction of the apparatus itself is not a part of this invention, it is sufficient to say that the plungers 8 and 9 may be normally actuated in opposing directions from each other by any suitable spring connection and positively actuated toward each other by cams 12 and 13. Said cams are mounted upon drive shafts 14, 15, 16 and 17 provided with a system of power transmission, all of which is not shown, but which includes the gears 18 and the sprocket and chain construction 19. It will be understood that the cams are set and the shafts rotated so that each pair of said plungers 8 and 9 is moved to compression position when the successive cavities 7 are brought into alinement therewith to compress the separated particles of the iced mass into shapes. After the compressing operation, which serves to form the contained material in the cavities 7 into selected geometrical formations, the plate 6 is advanced so as to bring the cavities 7 into registration with the discharge mechanism.

Each discharge mechanism comprises a plunger 20 mounted in a hollow boss 21 supported at the end of a bracket secured to the interior wall of the housing 1, each plunger being operated by a cam 22 carried on a shaft 23 to depress the plunger into the respective one of the cavities 7 that is in registration therewith, and thereby force the formed crystal into a discharge chute 24, from which it is discharged to the interior of the housing. In order to prevent the crystals that accumulate in the bottom part of the housing from coming in contact with the plunger operating mechanism, that mechanism is protected by a central housing 5a. The accumulated crystals may be removed from the bottom of the housing through an air tight door 24a.

The plunger 20 is equipped with a spring 25 normally holding it raised above the upper face of the plate 6. The shafts 23 are driven by suitable gear connections 26 with the shafts 14 and 15 respectively, whereby said shafts 23 rotate to operate the cams 22 to depress the plungers 20 at predetermined intervals.

It will be understood that due to the lateral pressure exerted in compressing the separated particles of ice by the crystal forming dies, the shapes will remain in the cavities 7 until the movement of the plate 6 brings them beneath the respective plunger 20. The forming plungers and the discharge plungers operate at the same speed. Thus, as each pair of crystals is formed, the previously formed pair of crystals are ejected from the apparatus.

Any suitable mechanism for imparting to the plate 6 an intermittent rotary movement may be employed. The mechanism shown in the drawing comprises a shaft 28 supported in a bearing 29, which shaft is driven from a pulley 30 having a frictional clutch connection 31 with the shaft. The shaft is resiliently connected with the plate 6 by a torsion spring 32, thereby providing an even and constant torque on the plate 6.

The plate 6 is provided with an escapement mechanism which automatically brings the cavities 7 into registration with the forming dies and holds the plate in this position until the dies have compressed the ice and then retracts to clear the plate and also to permit the reciprocation of the plungers 20 to eject the previously formed shapes from the machine.

This escapement mechanism may be of any suitable construction, that shown in the drawing comprising an escapement bar 33 mounted in a bracket 34 rigidly supported within the housing and being normally raised by a spring 35. The plate 6 has a series of equally spaced depressions 36 in its upper face which cooperate with the escapement bar 33. The escapement bar is operated by a lever 37 supported on a bracket 38, said lever being raised intermittently by a cam 39.

The housing 1 is hermetically sealed and the interior of the housing is charged with a gas through pipes 40 and 41. Gas, such as carbon dioxide is forced into the housing under sufficient pressure so that during the interval required for the movement of the cavities 7 from the point where they are filled from the hoppers with the finely divided ice particles to the point of compression, the gas permeates the uncompressed mass and when the mass is compressed into the crystals, the gas is trapped and held within the compressed body, thus impregnating each crystal. It is also contemplated that flavoring extracts, syrups or other fluids may be mixed with the supply of the separated particles of ice in the hoppers or may be added within the housing before compression of the crsytals.

Crystals thus formed impregnated with a gas and with suitable fluids may be added to water or other beverages and upon melting, discharge the gas into the beverage and supply the flavoring fluid, thereby carbonating the beverage, cooling it and flavoring it at the same time.

What I claim and desire to secure by Letters Patent is:—

1. The process of forming ice crystals which comprises successively separating measured quantities of ice particles from a common supply, passing the separated quantities through a volume of gas under pressure, and compressing the measured quantities into shapes when impregnated with the gas.

2. The process of making ice crystals which consists in selecting measured quantities of separated ice particles including a flavoring fluid, passing the measured quantities through a volume of gas, and compressing the separated ice particles into compact bodies.

3. The process of making molded ice crystals which consists in subjecting separated quantities of ice from a mass to pressure in the presence of a volume of gas.

4. The process of forming ice crystals which consists in passing separated quantities of the ice mass through a volume of carbon dioxide gas under pressure, and molding the separated quantities by compacting them while impregnated with the gas.

5. The process of forming compacted ice bodies which consists in molding quantities of finely divided ice particles in an atmosphere of carbon dioxide gas.

SAMUEL C. CARNEY.